United States Patent
Polizzano

Patent Number: 6,001,441
Date of Patent: Dec. 14, 1999

[54] SANITARY STRIP FOR DRINKING VESSELS

[76] Inventor: Ross Polizzano, 28 DeGray Terrace, Mahwah, N.J. 07430

[21] Appl. No.: 08/822,394

[22] Filed: Mar. 20, 1997

Related U.S. Application Data

[63] Continuation of application No. 08/553,968, Nov. 6, 1995, abandoned.

[51] Int. Cl.$^6$ ........................................................ B32B 7/00

[52] U.S. Cl. ..................... 428/40.1; 206/447; 206/820; 428/41.7; 428/41.8; 428/41.9; 428/192

[58] Field of Search .................................. 428/40.1, 41.7, 428/41.8, 41.9, 192; 206/820, 447

[56] References Cited

U.S. PATENT DOCUMENTS

| | | | |
|---|---|---|---|
| 3,294,611 | 12/1966 | Vomela | 156/230 |
| 3,484,972 | 12/1969 | Christman | 428/41.7 |
| 3,506,743 | 4/1970 | Ettre | 428/914 |

Primary Examiner—Nasser Ahmad
Attorney, Agent, or Firm—Salvatore C. Mitri

[57] ABSTRACT

There is disclosed a sanitary strip for drinking vessels which can be attached or affixed to the lip area of a drinking vessel to prevent the transfer of germs, bacteria, viruses, and other contaminants to the user of the drinking vessel. The sanitary strip is contained in a unitary, composite article having two peelably removable plys that overlay and are coextensive with the sanitary strip so that the sanitary strip is sandwiched by and between the peelably removable plys.

2 Claims, 2 Drawing Sheets

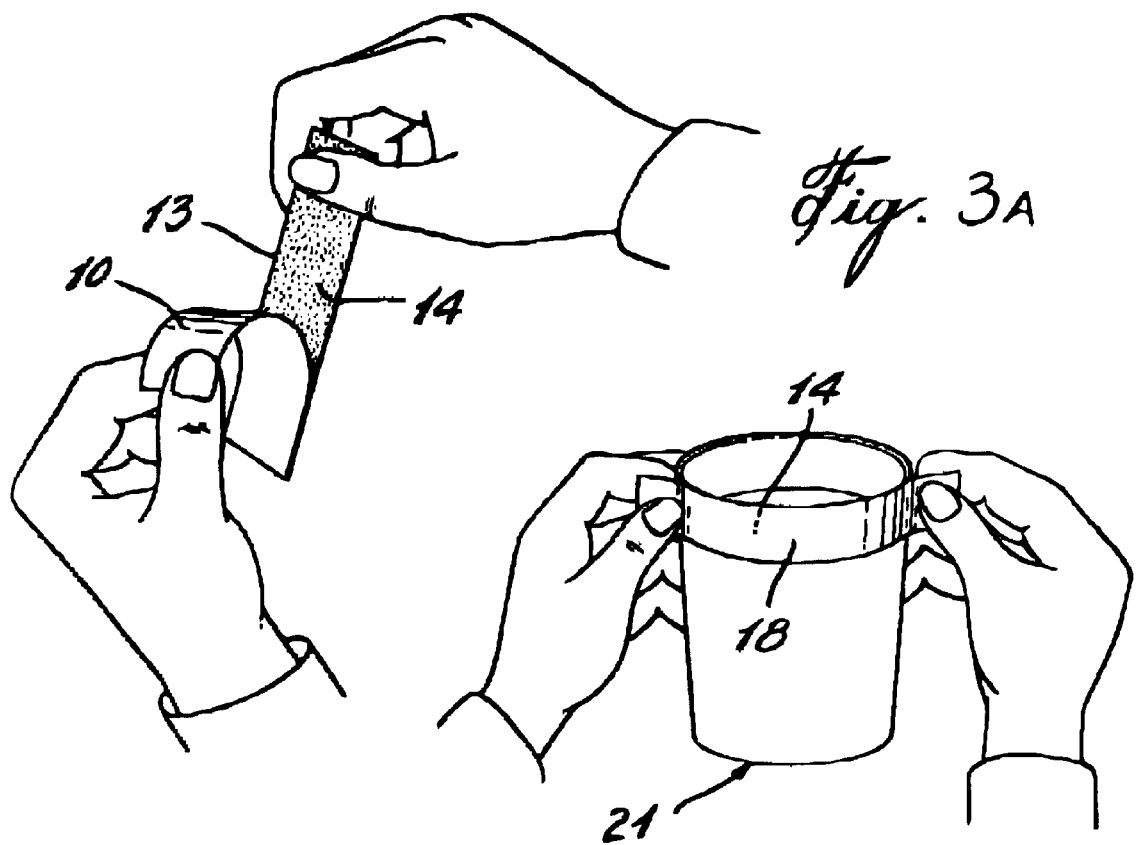
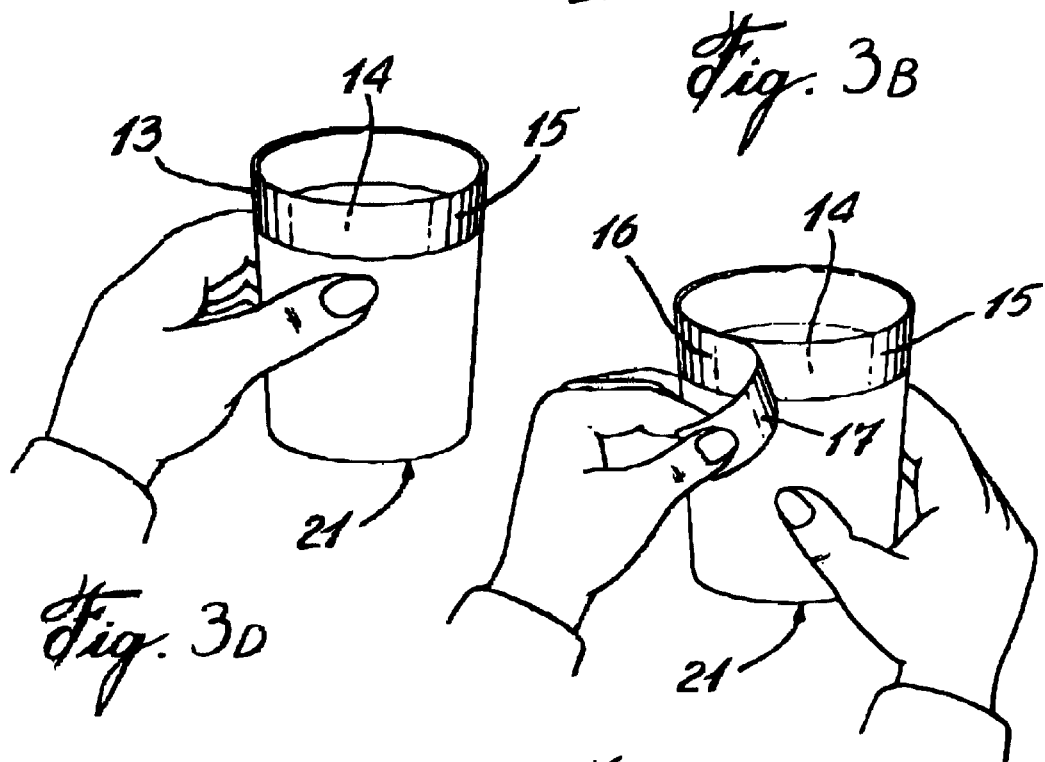

SANITARY STRIP FOR DRINKING VESSELS

This application is a continuation of application Ser. No. 08/553,968 filed Nov. 6, 1995 now abandoned.

FIELD OF THE INVENTION

This invention is directed to a sanitary strip which is attached or affixed to the lip area of drinking vessels such as cups, glasses, mugs, and the like. Since the sanitary strip carries no germs, bacteria, viruses or other contaminants, the user of a drinking vessel having the sanitary strip attached to it will not become infected with any germs, bacteria, viruses or other contaminants that may have been present on the lip area of the drinking vessel.

BACKGROUND OF THE INVENTION

Even after they have been washed, either by hand or in a dish washer, drinking vessels are typically handled by a person before they are used. Such handling affords an opportunity for germs, bacteria, viruses and other contaminants to be readily transferred from the handler to the drinking vessel, including its lip area, and thence from the lip area to the person using the drinking vessel. The opportunity for such transfer is particularly present in public and private institutions such as hospitals, nursing homes, clinics, and the like, where germs, bacteria, viruses and other contaminants are prevalent as well as in restaurants, bars, hotels, motels and other public and private dining areas where handlers of drinking vessels do not always follow or practice good hygienic habits.

SUMMARY OF THE INVENTION

It has now been found that the transfer of germs, bacteria, viruses and other contaminants that may be carried on the lip areas of drinking vessels to the users of such drinking vessels can be significantly and substantially reduced and minimized by using the sanitary strip of the invention. The sanitary strip of the invention is contained in a unitary, composite article which, in general, comprises three plys: a first peelably removable ply; a sanitary strip middle ply; and, a second peelably removable ply. These plys are assembled to form the unitary, composite article by overlaying each ply, one on top of the other, so that they are each coextensive with one another with the sanitary strip middle ply sandwiched by and between the first and second peelably removable plys.

In one embodiment, the first peelably removable ply has an outer surface and an inner surface, each of which do not carry an adhesive coating; the upper surface of the sanitary strip middle ply is adhesive coated while its lower surface is uncoated; and, the inner surface of the second peelably removable ply is adhesive coated while its outer surface is uncoated. When assembled, the uncoated inner surface of the first peelably removable ply overlays and is coextensive with the adhesive coated upper surface of the sanitary strip middle ply, and the adhesive coated inner surface of the second peelably removable ply overlays and is coextensive with the uncoated lower surface of the sanitary strip middle ply.

In another embodiment, the outer surfaces of the first peelably removable ply and the second peelably removable ply are each provided with a conventional pull tab to facilitate their removal from the sanitary strip middle ply and enable the sanitary strip to be readily affixed to the lip area of a drinking vessel.

The unitary, composite article containing the sanitary strip can be provided in sizes to accommodate the circumferential lip areas of various sized drinking vessels to which the sanitary strip is to be attached. Typically, the unitary, composite article can be sized to have a width of from about 1 inch to about 2 inches and a length of from about 4 inches to about 8 inches. Using methods well known to those skilled in the art, the unitary, composite article can be packaged in the form of individual units that can be separately dispensed from a container or in the form of a roll from which desired lengths can be cut.

BRIEF DESCRIPTION OF THE DRAWING

The sanitary strip of the invention will become more apparent from the ensuing description when considered together with the accompanying drawing which illustrates preferred embodiments thereof and wherein.

DETAILED DESCRIPTION OF THE DRAWING AND THE INVENTION

Figure 1:
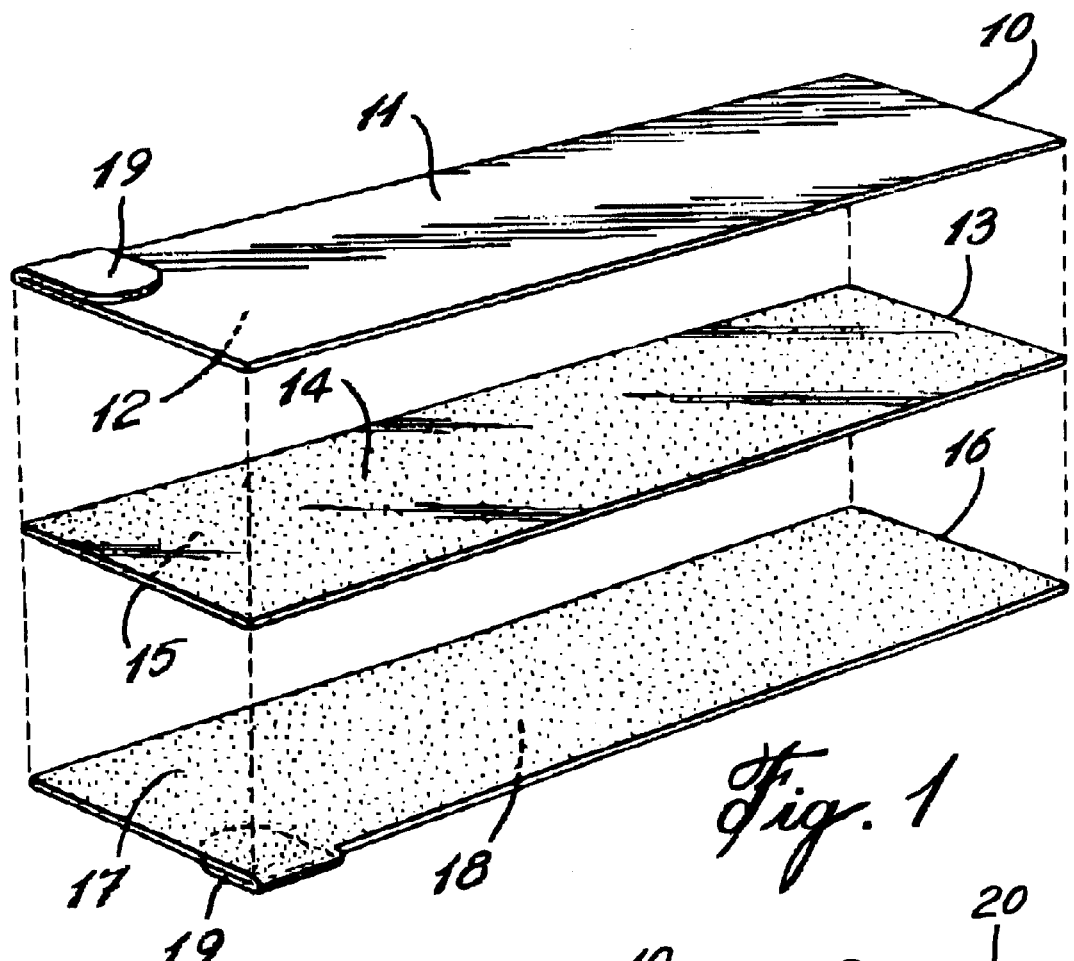
FIG. 1 is an exploded perspective view of the three plys which form the unitary, composite article containing the sanitary strip of the invention.
Figure 2:
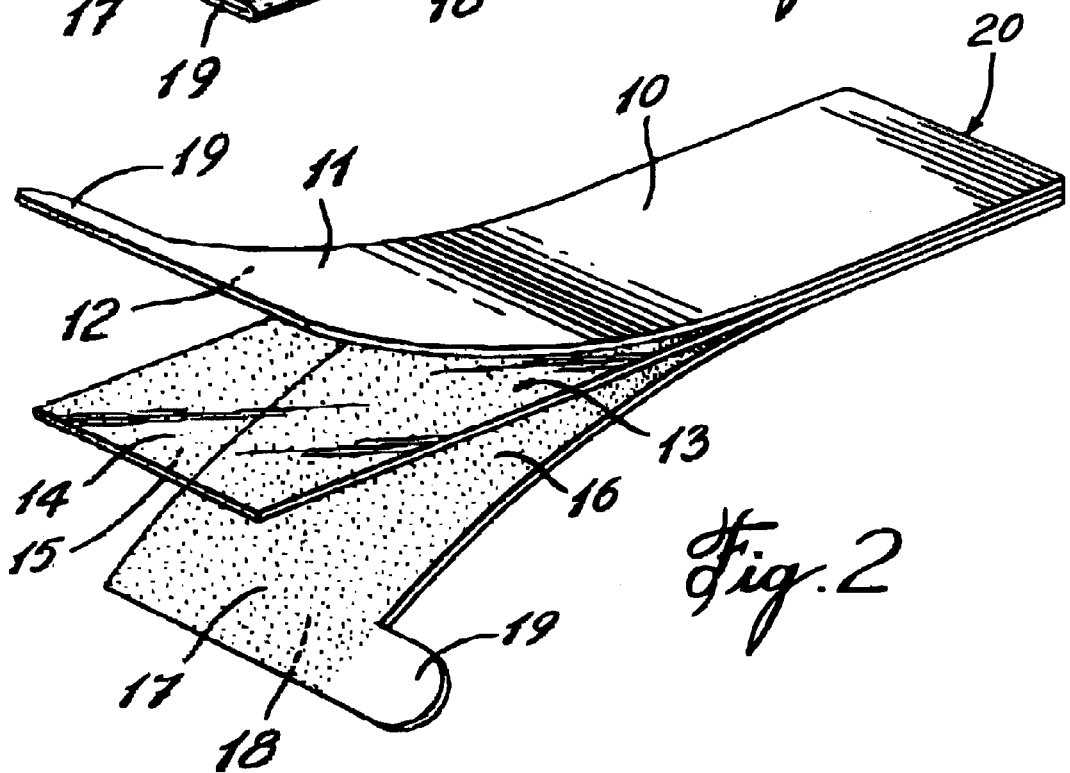
FIG. 2 is a perspective view illustrating the relationship of the three plys to one another in partial assembly; and, FIGS. 3A–3D are each perspective views collectively illustrating a sequential method for manually attaching or affixing the sanitary strip of the invention to the lip area of a drinking vessel.

With reference to the drawing, wherein like references numerals denote like parts, it can be seen from FIGS. 1 and 2 that the unitary composite article containing the sanitary strip of the invention comprises three plys: a first peelably removable ply 10; a sanitary strip middle ply 13; and a second peelably removable ply 16. When assembled, these plys form the unitary, composite article generally identified in FIG. 2 by reference numeral 20. The outer and inner surfaces 11 and 12, respectively, of first peelably removable ply 10 are uncoated; i.e.; they each do not contain an adhesive. The upper surface 14 of sanitary strip middle ply 13 is adhesive coated and its lower surface 15 is uncoated. The inner surface 17 of the second peelably removable ply 16 is adhesive coated whereas its outer surface 18 is uncoated. To facilitate removal of first and second peelably removable plys 10 and 16, respectively, a pull tab 19 can be provided by conventional means adjacent one of the ends of their outer surfaces 10 and 18, respectively.

When assembled as a unitary, composite article (FIG. 2), the uncoated inner surface 12 of the first peelably removable strip 10 overlays and is coextensive with the adhesive coated upper surface 14 of sanitary strip middle ply 13 and the adhesive coated inner surface 17 of the second peelably removable ply 16 overlays and is coextensive with the uncoated lower surface 15 of sanitary strip middle ply 13 so that the sanitary strip middle ply 13 is sandwiched between and is contained by the first and second peelably removable plys 10 and 16, respectively. The first and second peelably removable plys 10 and 16 thus serve as protective coverings to preserve the integrity of the sanitary strip middle ply 13.

It is important that after being assembled, the unitary, composite article 20 (FIG. 2) be treated to insure that the sanitary strip middle ply 13 is free from germs, bacteria, viruses, and other contaminants. This can be accomplished by techniques well known to those skilled in the art such as irradiating the composite article 20 with ultra violet light, subjecting the composite article 20 to laser beam radiation, and the like. Although the composite article 20 will be handled after such treatment in order to remove the first and second peelably removable plys, 10 and 16, and affix the sanitary strip middle ply 13 to the lip area of a drinking vessel, the sanitary integrity of sanitary strip middle ply 13 is assured from the protection afforded it by the first and second peelably removable plys 10 and 16.

As shown in FIGS. 3A–3D, the sanitary strip of the invention can be manually attached or affixed to the lip area of a drinking vessel such as a cup, glass, mug, and the like, generally identified by reference numeral 21, by first removing the first peelably removable ply 10 to expose the adhesive coated upper surface 14 of sanitary strip middle ply 13 (FIG. 3A). The adhesive coated upper surface 14 of sanitary strip middle ply 13 is then affixed or attached to the circumferential lip area of a drinking vessel 21 as shown in FIG. 3B. At this time, the uncoated outer surface 18 of the second peelably removable ply 16 is exposed around the circumferential lip area of the drinking vessel 21. When the drinking vessel 21 is ready to be used, the second peelably removable ply 16 is removed to expose the uncoated lower surface 15 of the sanitary strip middle ply 13 (FIG. 3C) leaving only the sanitary strip middle ply 13 secured to the circumferential lip area of the drinking vessel 21 (FIG. 3D).

The plys comprising the unitary composite article containing the sanitary strip of the invention can be made from any suitable materials and the individual plys; i.e., the first and second peelably removable plys and the sanitary strip middle ply, can be made from the same or different materials. For example, these plys can be made from suitable plastics or plastic coated papers which can include, without limitation, polyethylene, polypropylene, polyethylene-coated paper, polypropylene-coated paper, polyurethane, elastomeric polyesters, and the like. Preferably all plys are made from a polymeric material with the first and second peelably removable plys being opaque and the sanitary strip middle ply being transparent.

similarly, the adhesives employed to coat the surfaces of the plys can be selected from suitable pressure sensitive adhesives well known to those skilled in the art such as thermoplastic polymers and copolymers. These can include, without limitation, acrylate and acrylate copolymers, vinyl and vinyl copolymers, and the like.

The unitary composite article containing the sanitary strip of the invention can be assembled and manufactured using methods and techniques well known to those skilled in the art. For example, one method that can be used would involve laying up sheets of the three, separate plays, overlaying them on one another so that they are all coextensive with one another (see FIGS. 1 and 2) and then cutting the sheets into desired lengths and widths for packaging such as, for example, individual units to be separately dispensed from a container, a continuous roll from which desired lengths can be cut, and the like.

What is claimed is:

1. A drinking vessel three ply sanitary strip which sanitary strip is contained in a unitary, composite article consisting essentially of:

(a) a first peelably removable ply having an outer surface and an inner surface, each of said surfaces being free of adhesive coating;

(b) a second peelably removable ply having an outer surface free of adhesive coating and an adhesive coated inner surface; and, (c) a third sanitary strip middle ply having an adhesive coated upper surface and a lower surface free of adhesive coating, said sanitary strip middle ply being sandwiched between and contained by said first and second peelably removable plies such that the first ply overlies the adhesive coated upper surface of the middle ply and the second ply overlies the lower surface of the middle ply, said first peelably removable ply, said second peelably removable ply, and said sanitary strip middle ply each overlying and being coextensive with one another such that when said first ply is peelably removed from said sanitary strip, the adhesive coated upper surface of said sanitary strip is exposed enabling said sanitary strip to be affixed to the circumferential lip area of a drinking vessel and when said second ply is peelably removed from said sanitary strip, the lower surface of said sanitary strip free of adhesive coating is exposed to the user of said drinking vessel.

2. The sanitary strip of claim 1 wherein the outer surface of said first peelably removable ply and the outer surface of said second peelably removable ply each include a pull tab adjacent one of their ends.

\* \* \* \* \*